(12) United States Patent
Tatsumoto et al.

(10) Patent No.: US 12,175,416 B2
(45) Date of Patent: Dec. 24, 2024

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Yuki Tatsumoto, Nissin (JP); Yukinari Kato, Okazaki (JP); Toshiki Kashiwakura, Tokyo (JP); Hiroyuki Suzuki, Miyoshi (JP); Hirohiko Taniguchi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 17/885,966

(22) Filed: Aug. 11, 2022

(65) Prior Publication Data

US 2023/0071124 A1 Mar. 9, 2023

(30) Foreign Application Priority Data

Sep. 7, 2021 (JP) .................................. 2021-145427

(51) Int. Cl.
*G06Q 10/0836* (2023.01)
*G06Q 10/083* (2024.01)
*G06Q 10/0833* (2023.01)

(52) U.S. Cl.
CPC ..... *G06Q 10/0836* (2013.01); *G06Q 10/0833* (2013.01); *G06Q 10/0838* (2013.01)

(58) Field of Classification Search
CPC ........... G06Q 10/0836; G06Q 10/0833; G06Q 10/0838
See application file for complete search history.

(56) References Cited

U.S. PATENT DOCUMENTS

| 10,657,486 B1* | 5/2020 | Wolter ............... G06Q 10/0833 |
| 2018/0060800 A1* | 3/2018 | Robinson ........... G07C 9/00571 |
| 2019/0164114 A1 | 5/2019 | Kadotani et al. |

(Continued)

FOREIGN PATENT DOCUMENTS

| JP | 2019-096201 A | 6/2019 |
| JP | 2019-121126 A | 7/2019 |
| JP | 2020-140508 A | 9/2020 |

OTHER PUBLICATIONS

Alexandra Lagorio, The parcel locker location issues: an overview of factors affecting their location, 2020, p. 1-2 (Year: 2020).*

*Primary Examiner* — Ibrahim N El-Bathy
(74) *Attorney, Agent, or Firm* — Dinsmore & Shohl LLP

(57) ABSTRACT

An information processing device includes a control unit configured to send first information including a first date and time, to a user terminal, at a predetermined timing before the first date and time, the first date and time being a date and time at which baggage deposited in a movable locker is planned to be taken out, the movable locker being mounted on a vehicle, the user terminal being used by a user that has deposited the baggage in the locker. The predetermined timing is a timing that is earlier than the first date and time by a first time length. The control unit sets the first time length such that the first time length is longer as the distance between a first place and the position of the user terminal is longer, the first place being a place at which the baggage is planned to be taken out.

15 Claims, 13 Drawing Sheets

(56) References Cited

U.S. PATENT DOCUMENTS

2019/0206163 A1  7/2019  Sakurada et al.
2020/0250611 A1* 8/2020  Pourteymour .......... G06F 9/542
2021/0097486 A1* 4/2021  Boccuccia ....... G06Q 10/08355

* cited by examiner

FIG. 4

| LOCKER ID | VEHICLE ID | AUTHENTICATION INFORMATION |
|---|---|---|
|  |  |  |
|  |  |  |
|  |  |  |

FIG. 5

| SERVICE ID | USER ID | LOCKER ID | DEPOSIT DATE AND TIME | DEPOSIT PLACE | TAKE-OUT DATE AND TIME (FIRST DATE AND TIME) | TAKE-OUT PLACE (FIRST PLACE) | CURRENT POSITION OF VEHICLE | PREDE-TERMINED TIMING | TAKE-OUT COMPLE-TION NOTICE |
|---|---|---|---|---|---|---|---|---|---|
| 001 | U01 | L001 | --- | P001 | --- | P005 | --- | --- | RECEIVED |
| ・・・・ | ・・・・ | ・・・・ | ・・・・ | ・・・・ | ・・・・ | ・・・・ | ・・・・ | ・・・・ | ・・・・ |

FIG. 9

| SERVICE ID | USER ID | LOCKER ID | DEPOSIT DATE AND TIME | DEPOSIT PLACE | TAKE-OUT DATE AND TIME (FIRST DATE AND TIME) | TAKE-OUT PLACE (FIRST PLACE) | CURRENT POSITION OF VEHICLE | CURRENT SECOND DATE AND TIME | TAKE-OUT COMPLETION NOTICE |
|---|---|---|---|---|---|---|---|---|---|
| 001 | U01 | L001 | --- | P001 | --- | P005 | --- | --- | RECEIVED |
| ... | ... | ... | ... | ... | ... | ... | ... | ... | ... |

FIG. 11

| SERVICE ID | USER ID | LOCKER ID | DEPOSIT DATE AND TIME | DEPOSIT PLACE | TAKE-OUT DATE AND TIME (FIRST DATE AND TIME) | TAKE-OUT PLACE (FIRST PLACE) | CURRENT POSITION OF USER | THIRD DATE AND TIME | TAKE-OUT COMPLETION NOTICE |
|---|---|---|---|---|---|---|---|---|---|
| 001 | U01 | L001 | ---- | P001 | ---- | P005 | ---- | ---- | RECEIVED |
| ・・・・ | ・・・・ | ・・・・ | ・・・・ | ・・・・ | ・・・・ | ・・・・ | ・・・・ | ・・・・ | ・・・・ |

FIG. 13

```
LOCKER USE REQUEST SCREEN

DEPOSIT     ○  [ INPUT KEYWORD ]   (RETRIEVAL)
  PLACE
              ○  SELECTION FROM MAP

○  SELECTION FROM
                 REGISTERED ADDRESSES

DEPOSIT          [▼] M   [▼] D   [▼] H   [▼] M
  DATE AND TIME

⬇

TAKE-OUT    ○  [ INPUT KEYWORD ]   (RETRIEVAL)
  PLACE
              ○  SELECTION FROM MAP

○  SELECTION FROM
                 REGISTERED ADDRESSES

TAKE-OUT         [▼] M   [▼] D   [▼] H   [▼] M
  DATE AND TIME

NOTICE TIMING   [                          ▼]

(REQUEST  )    ( CANCEL )
              ( START   )
```

# INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2021-145427 filed on Sep. 7, 2021, incorporated herein by reference in its entirety.

BACKGROUND

1. Technical Field

The present disclosure relates to an information processing device, an information processing method and a storage medium.

2. Description of Related Art

There has been disclosed a locker management system that decides a locker to be used by a user based on a use request for a locker from the user, and that dispatches an automatic driving vehicle including the decided locker, to the user (for example, Japanese Unexamined Patent Application Publication No. 2019-96201).

SUMMARY

An object of the present disclosure is to provide a technology that can help the user to not forget to take out baggage in a baggage keeping service with a movable locker mounted on a vehicle.

An aspect of the present disclosure is an information processing device including a control unit configured to send first information including a first date and time, to a user terminal, at a predetermined timing before the first date and time, the first date and time being a date and time at which baggage deposited in a movable locker is planned to be taken out, the movable locker being mounted on a vehicle, the user terminal being used by a user that has deposited the baggage in the locker.

Another aspect of the present disclosure is an information processing method in which a computer sends first information including a first date and time, to a user terminal, at a predetermined timing before the first date and time, the first date and time being a date and time at which baggage deposited in a movable locker is planned to be taken out, the movable locker being mounted on a vehicle, the user terminal being used by a user that has deposited the baggage in the locker.

Another aspect of the present disclosure is a storage medium that stores a program for causing a user terminal to output first information including a first date and time, at a predetermined timing before the first date and time, the first date and time being a date and time at which baggage deposited in a movable locker is planned to be taken out, the movable locker being mounted on a vehicle.

The present disclosure can be regarded as a non-transitory storage medium in which the above program is stored.

With the present disclosure, it is possible to provide a technology that can help the user to not forget to take out baggage in a baggage keeping service with a movable locker mounted on a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an example of information that is held in a locker information DB;

FIG. 5 is an example of information that is held in a service information DB in a first embodiment;

FIG. 9 is an example of information that is held in a service information DB in a second embodiment;

FIG. 11 is an example of information that is held in a service information DB in a third embodiment;

FIG. 13 is an example of a locker use request screen on the user terminal.

DETAILED DESCRIPTION OF EMBODIMENTS

Figure 1:
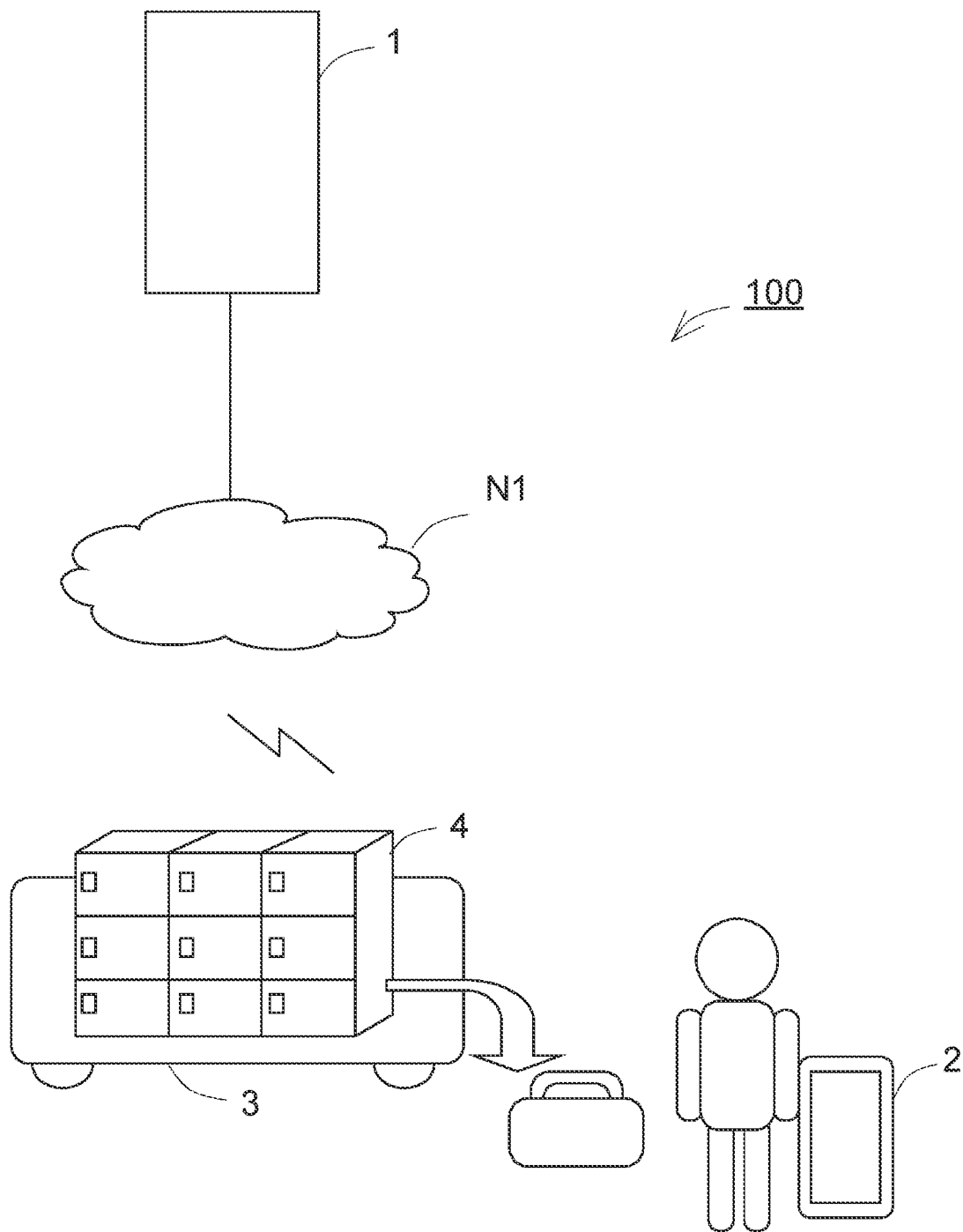
FIG. 1 is a diagram showing an example of a system configuration of a mobile locker system according to a first embodiment.

There is a system that provides a baggage temporary-keeping service in which a user can deposit baggage in a locker or take out baggage from a locker at a place designated by the user by the movement of a vehicle on which the locker is mounted. Hereinafter, the locker that is mounted on the vehicle and that can move is referred to as a mobile locker. Hereinafter, the baggage temporary-keeping service with the mobile locker is referred to as a mobile locker service.

When the user uses the mobile locker service, the user designates a place at which the user deposits the baggage, a date and time at which the user deposits the baggage, a place at which the user takes out the baggage, and a date and time at which the user takes out the baggage, for example. However, for example, there is a possibility that the user forgets a plan in which the user takes out the baggage from the mobile locker at the designated date and time. In that case, the baggage is not taken out from the mobile locker at the designated place at the designated date and time, and therefore, there is a possibility that the vehicle on which the mobile locker is mounted cannot operate in accordance with an operation schedule.

Hence, in an aspect of the present disclosure, a notice of first information including a first date and time is given to the user at a predetermined timing before a first date and time (a date and time at which the baggage is planned to be taken out) designated by the user. Specifically, an aspect of the present disclosure is an information processing device including a control unit. At the predetermined timing before the first date and time at which the baggage deposited in the movable locker mounted on the vehicle is planned to be taken out, the control unit sends the first information including the first date and time, to a user terminal that is used by the user that has deposited the baggage in the locker. Thereby, even when the user forgets the plan in which the user takes out the baggage from the mobile locker at the first date and time, it is possible to remind the user about the plan before the first date and time. As a result, it is possible to help the user to not forget to take out the baggage from the mobile locker at the first date and time.

For example, the information processing device is a computer such as a server. For example, the control unit is a processor such as a central processing unit (CPU) included in the computer. For example, the user terminal is a terminal that can be carried by the user, as exemplified by a smartphone, a tablet terminal or a wearable terminal. The vehicle may be a vehicle that travels with the driving by a driver, or may be an automatic traveling vehicle that can travel without the driving by the driver. The locker mounted on the vehicle corresponds to the mobile locker.

In the aspect of the present disclosure, the predetermined timing may be a date and time that is earlier than the first date and time by a first time length. In this case, the control unit may send the first information to the user terminal at the timing that is earlier than the first date and time by the first time length. Thereby, it is possible to remind the user about the plan in which the user takes out the baggage from the mobile locker at the first date and time, at the timing that is earlier than the first date and time by the first time length.

The first time length may be set based on the distance between the first place at which the baggage is planned to be taken out and the position of the user terminal. In this case, the control unit may execute acquiring the position of the user terminal, and setting the first time length such that the first time length is longer as the distance between the first place and the position of the user terminal is longer. The position of the user terminal that is carried by the user can be regarded as the position of the user. Therefore, the position of the user is estimated to be more distant from the first place, as the distance between the position of the user terminal and the first place is longer. The time required for the user to move to the first place is longer, as the position of the user is more distant from the first place. Meanwhile, when the first time length is set such that the first time length is longer as the distance between the position of the user terminal and the first place is longer, the predetermined timing becomes an earlier timing as the distance between the position of the user terminal and the first place is longer. That is, it is possible to remind the user about the plan in which the user takes out the baggage from the mobile locker at the first date and time, at an earlier timing, as the position of the user is more distant from the first place. Thereby, the user can move to the first place by the first date and time, even when the user is at a place distant from the first place. As a result, the user can take out the baggage from the mobile locker by the first date and time.

It is allowable to adopt a configuration in which the user can arbitrarily designate the first time length. In this case, the control unit may accept a designation of the first time length from the user terminal. Thereby, the user can receive the first information at an arbitrary timing.

In the aspect of the present disclosure, the predetermined timing may be set to a timing that is equal to or later than a date and time earlier than the first date and time by a second time length and at which the distance between the position of the vehicle and the first place becomes equal to or shorter than a first distance. In this case, the control unit may execute acquiring the position of the vehicle, and sending the first information to the user terminal, at the timing that is equal to or later than the date and time earlier than the first date and time by the second time length and at which the distance between the position of the vehicle and the first place becomes equal to or shorter than the first distance. Thereby, even when the distance between the position of the vehicle and the first place becomes equal to or shorter than the first distance before the date and time (referred to as a "second date and time" hereinafter) earlier than the first date and time by the second time length, the first information is not sent to the user terminal until the second date and time or later. That is, even when the distance between the position of the vehicle and the first place becomes equal to or shorter than the first distance at an excessively early timing relative to the first date and time, it is possible to prevent the first information from being sent to the user terminal.

In the aspect of the present disclosure, the predetermined timing may be set to a timing that is equal to or later than a date and time earlier than the first date and time by a third time length and at which the distance between the position of the user terminal and the first place becomes equal to or shorter than a second distance. In this case, the control unit may execute acquiring the position of the user terminal, and sending the first information to the user terminal, at the timing that is equal to or later than the date and time earlier than the first date and time by the third time length and at which the distance between the position of the user terminal and the first place becomes equal to or shorter than the second distance. Thereby, even when the distance between the position of the user terminal and the first place becomes equal to or shorter than the second distance before the date and time (referred to as a "third date and time" hereinafter) earlier than the first date and time by the third time length, the first information is not sent to the user terminal until the third date and time or later. That is, even when the distance between the position of the user terminal and the first place becomes equal to or shorter than the second distance at an excessively early timing relative to the first date and time, it is possible to prevent the first information from being sent to the user terminal.

In the aspect of the present disclosure, it is allowable to adopt a configuration in which the user can designate a setting condition of the predetermined timing. For example, the control unit may accept a designation of one of (1) the timing that is earlier than the first date and time by the first time length, (2) the timing that is equal to or later than the date and time earlier than the first date and time by the second time length and at which the distance between the position of the vehicle and the first place becomes equal to or shorter than the first distance, and (3) the timing that is equal to or later than the date and time earlier than the first date and time by the third time length and at which the distance between the position of the user terminal and the first place becomes equal to or shorter than the second distance, as the predetermined timing, from the user terminal. Thereby, the user can designate the setting condition of the predetermined timing that is the timing at which the first information is sent to the user terminal. As a result, the user can receive the first information at a timing suitable for the user.

In the aspect of the present disclosure, the designation of one of the above (1) to (3) may be performed together with a use request for the mobile locker. In this case, the control unit may accept the designation from the user terminal, together with the use request for the mobile locker. Thereby, the user can perform the designation when the user performs the use request for the mobile locker.

In the aspect of the present disclosure, as the first information, the control unit may send information including the current position of the vehicle and a planned arrival date and time of the vehicle at the first place, to the user terminal, in addition to the first date and time. Thereby, the user can know the current position of the vehicle and the planned arrival date and time of the vehicle at the first place, in addition to the first date and time. As a result, for example, the user can move to the first place in consideration of the current position of the vehicle and/or the planed arrival date and time.

As another aspect, the present disclosure can be specified as an information processing method that is executed by a computer. In the information processing method, the computer sends first information including a first date and time, to a user terminal, at a predetermined timing before the first date and time, the first date and time being a date and time at which baggage deposited in a locker is planned to be taken out, the locker being mounted on a vehicle, the user terminal being used by a user that has deposited the baggage in the locker. The computer is a computer that operates as the above information processing device.

As another aspect, the present disclosure can be specified as a program, or a non-transitory computer-readable recording medium in which the program is recorded. The program causes a user terminal to output first information including a first date and time, at a predetermined timing before the first date and time, the first date and time being a date and time at which baggage deposited in a locker is planned to be taken out, the locker being mounted on a vehicle. The user terminal in this case is a terminal that is used by the user that has deposited the baggage in the locker.

Embodiments of the present disclosure will be described below based on the drawings. Configurations of the following embodiments are examples, and the present disclosure is not limited to the configurations of the embodiments.

First Embodiment

FIG. 1 is a diagram showing an example of a system configuration of a mobile locker system 100 according to a first embodiment. The mobile locker system 100 is a system that provides a movable coin-operated locker by the traveling of a vehicle on which a coin-operated locker is mounted. The user can deposit the baggage in the locker at a designated place, and after the baggage is retained for a predetermined period, the user can take out the baggage from the locker at a designated place. The place at which the baggage is deposited and the place at which the baggage is taken out may be different from each other. For example, the user pays usage fees depending on the time length during which the baggage is retained, the distance between the place at which the baggage is deposited and the place at which the baggage is taken out, and the like.

The mobile locker system 100 includes a center server 1, a locker 4, a vehicle 3 on which the locker 4 is mounted, and a user terminal 2 of a user that uses the service. The mobile locker system 100 includes a plurality of lockers 4, a plurality of vehicles 3 and a plurality of user terminals 2, but in FIG. 1, one locker 4, one vehicle 3 and one user terminal 2 are illustrated for convenience sake.

The locker 4 includes a plurality of storage portions in one housing. Each storage portion included in the locker 4 can be locked and unlocked. In the first embodiment, an electronic lock is employed for each storage portion of the locker 4. For example, the electronic lock employed for the locker 4 may be an electronic lock that is locked by operating an input device such as a numeric keypad provided on each storage portion and that is unlocked by inputting a password number to the input device. Alternatively, the electronic lock employed for the locker 4 may be an electronic lock that includes a receiver for a predetermined wireless signal and that is locked or unlocked, for example, when a lock signal or unlock signal is sent from the user terminal 2 together with authentication information and the received authentication information coincides with authentication information held by the receiver. The lock employed for the locker 4 is not limited to an electronic lock, and the locker 4 may be locked or unlocked by a physical lock. The baggage of the user is deposited in one of the storage portions of the locker 4. Hereinafter, one of the storage portions of the locker 4 is sometimes described as merely the "locker 4".

In principle, in the mobile locker service, it is assumed that the user that takes out the baggage from the locker 4 is the same as the user that deposits the baggage in the locker 4. However, the user that has deposited the baggage in the locker 4 may pass the authentication information or physical lock for the locker 4 to another user, and may request to take out the baggage.

In the first embodiment, the vehicle 3 is an autonomous traveling vehicle. However, a staff may ride on the vehicle 3, for helping to deposit or take out the baggage, taking out the baggage from the locker 4 or transporting the baggage from the vehicle 3 to the designated place. The transportation of the baggage taken out of the locker 4 from the vehicle 3 to the designated place may be performed, for example, by a drone or a small-size transportation robot, instead of a person. Further, the vehicle 3 may be a vehicle that travels with the driving by a driver. In the case where the vehicle 3 is a vehicle that travels with the driving by a driver, the staff that performs the user support or the transportation of the baggage from the vehicle 3 to the designated place may be the same as the driver. In the first embodiment, each vehicle 3 travels in an in-charge area. Further, the vehicle 3 may travel in an on-demand fashion in which the vehicle 3 travels in response to the generation of the request for service use, or may circulate along a predetermined route. In the first embodiment, the vehicle 3 travels in an on-demand fashion.

The user terminal 2 is a terminal that is used by a user that uses the service in the mobile locker system 100. For example, the user terminal 2 is a terminal that can be carried by the user, as exemplified by a smartphone, a tablet terminal or a wearable terminal. An application program for using the service in the mobile locker system 100 is installed in the user terminal 2.

The user terminal 2 and the vehicle 3 are connected with a network N1, and communicate with the center server 1 through the network N1. For example, the network N1 is a public network such as the internet. For example, a device having a communication function is mounted on the vehicle 3. By the device, the vehicle 3 can be connected with the network N1, and can communicate with the center server 1.

The center server 1 is a server that manages the mobile locker system 100. When the user uses the service in the mobile locker system 100, the user sends a locker use request to the center server 1 through the application program in the user terminal 2. Information that is designated by the user is also sent to the center server 1, together with the locker use request. The information that is designated by the user includes a place at which the baggage is deposited, a date and time at which the baggage is deposited, a place (first place) at which the baggage is taken out, and a date and time (first date and time) at which the baggage is taken out.

When the center server 1 receives the locker use request from the user terminal 2, the center server 1 decides a vehicle 3 that goes to the designated place at the designated date and time and a storage portion that is included in the locker 4 mounted on the vehicle 3 and in which the baggage is stored. In the first embodiment, the electronic lock is employed for the locker 4, and therefore the center server 1 gives a notice of the authentication information about the locker 4, to the user terminal 2. Thereafter, the user meets the vehicle 3 at the designated place, puts the baggage in the locker 4 mounted in the vehicle 3, and locks the locker 4 using the authentication information received from the center server 1. When the user takes out the baggage, the user meets the vehicle 3 at the previously designated first place at the previously designated first date and time, unlocks the locker 4 using the authentication information received from the center server 1, and takes out the baggage from the locker 4.

The user designates the first place at which the baggage is taken out and the first date and time at which the baggage is taken out. However, there is a possibility that the user forgets a plan (also referred to as a "first plan" hereinafter) in which the user meets the vehicle 3 at the first place at the first date and time and takes out the baggage from the locker 4 mounted on the vehicle 3. Hence, in the first embodiment, the center server 1 sends information (first information) relevant to the above plan, to the user terminal 2, at a predetermined timing before the first date and time. Examples of the predetermined timing include the following timings.

(1) A timing that is earlier than the first date and time by a first time length
(2) A timing that is equal to or later than a date and time earlier than the first date and time by a second time length and at which the distance between the current position of the vehicle 3 and the first place becomes equal to or shorter than a first distance
(3) A timing that is equal to or later than a date and time earlier than the first date and time by a third time length and at which the distance between the position of the user terminal 2 and the first place becomes equal to or shorter than a second distance One of the above (1) to (3) may be previously decided as the predetermined timing, or the user may designate one of the above (1) to (3) when the user performs the locker use request. In the first embodiment, as an example, the above timing (1) is previously decided as the predetermined timing.

The first information is information for reminding the user about the first plan, and includes the first date and time, for example. The first information may include the first place, the current position of the vehicle 3, a planned arrival date and time of the vehicle 3 at the first place, and the like, in addition to the first date and time.

In the first embodiment, the center server 1 sends the first information to the user terminal 2, at the predetermined timing that is the timing earlier than the first date and time by the first time length. Thereby, the center server 1 can cause the user to recognize the first date and time, the first place, and the current position of the vehicle 3, through the user terminal 2. As a result, in the case where the user forgets the first plan, it is possible to remind the user about the first plan before the first date and time. Consequently, it is possible to help the user to not forget to take out the baggage from the locker 4 of the vehicle 3 at the first place at the first date and time.

Hardware Configuration

Figure 2:
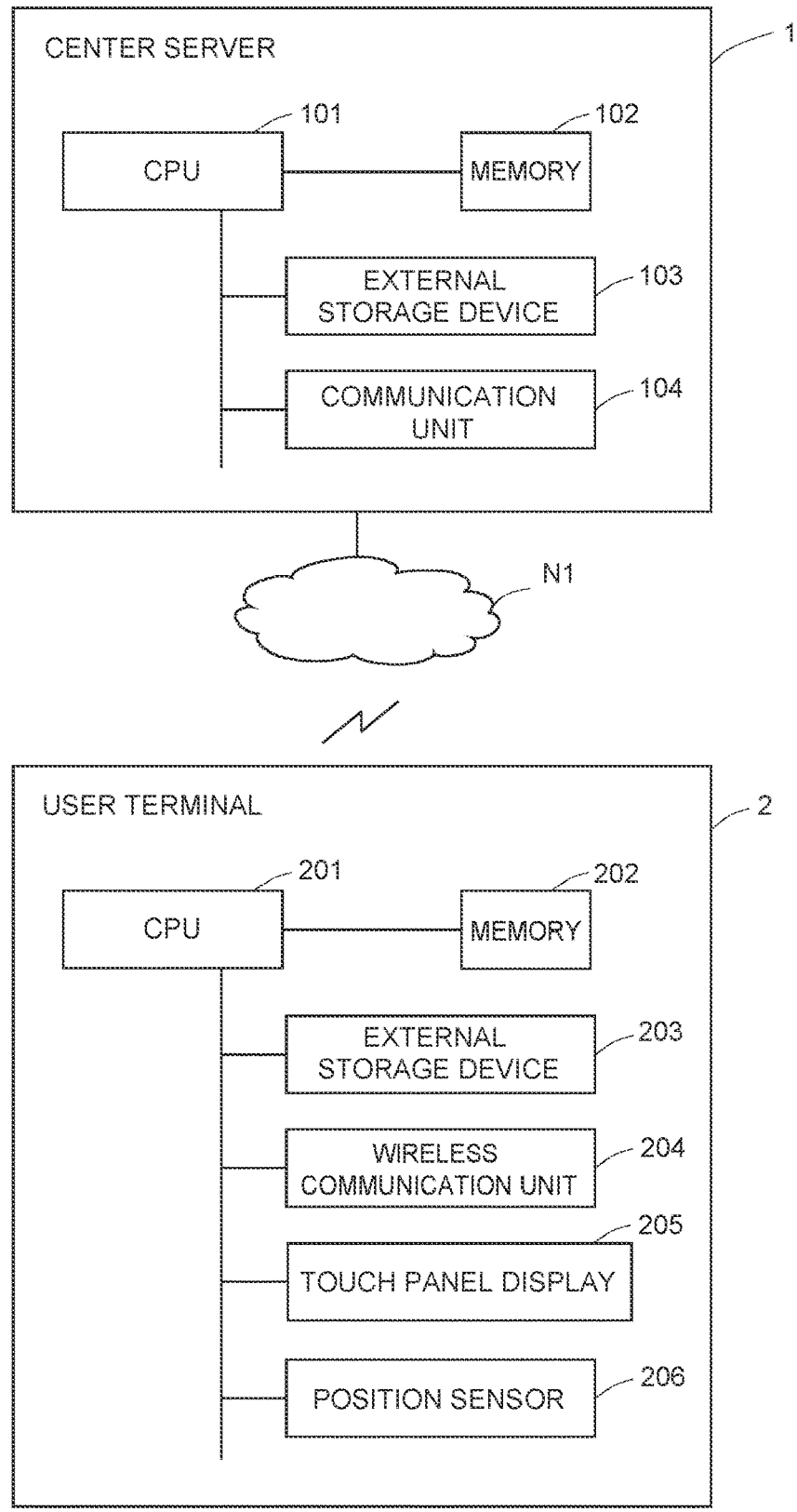
FIG. 2 is examples of hardware configurations of a center server and a user terminal.

FIG. 2 is examples of hardware configurations of the center server 1 and the user terminal 2. For example, the center server 1 is a server-dedicated computer or general-purpose computer. The center server 1 includes a CPU 101, a memory 102, an external storage device 103 and a communication unit 104, as the hardware configuration. Each of the memory 102 and the external storage device 103 is a computer-readable recording medium. The center server 1 is an example of the "information processing device".

The external storage device 103 stores various programs and data that is used by the CPU 101 at the time of the execution of the programs. For example, the external storage device 103 is an erasable programmable ROM (EPROM) or a hard disk drive. For example, the programs held in the external storage device 103 include an operating system (OS), a control program for the mobile locker system 100, and various other application programs.

The memory 102 is a storage device that provides, to the CPU 101, a storage region and work region on which programs stored in the external storage device 103 are loaded and that is used as a buffer. For example, the memory 102 includes a semiconductor memory such as a read only memory (ROM) and a random access memory (RAM).

The CPU 101 executes various processes by loading and executing the OS held in the external storage device 103 and various other application programs on the memory 102. The number of CPUs 101 is not limited to one, and a plurality of CPUs 101 may be provided. The CPU 101 is an example of the "control unit".

For example, the communication unit 104 is a network interface card (NIC). For example, the communication unit 104 is connected with an access network such as a local area network (LAN) by wire, and is connected with the network N1 through the access network. The communication unit 104 is not limited to a circuit that is connected with a network by wire, and for example, may be a wireless communication circuit that conforms to a wireless communication system such as WiFi or a mobile communication system.

Next, for example, the user terminal 2 is a small-size computer that can be carried by the user, as exemplified by a smartphone, a tablet terminal or a wearable terminal. The user terminal 2 includes a CPU 201, a memory 202, an external storage device 203, a wireless communication unit 204, a touch panel display 205 and a position sensor 206, as the hardware configuration. In FIG. 2, hardware constituent elements that perform the process about the first embodiment are extracted and shown as the hardware configuration of the user terminal 2, and hardware constituent elements included in the user terminal 2 are not limited to the elements shown in FIG. 2.

The CPU 201, the memory 202 and the external storage device 203 are the same as the CPU 101, the memory 102 and the external storage device 103. However, the storage device (storage) that is employed as the external storage device 203 is a flash memory, for example. A portable recording medium such as an SD card may be included as the external storage device 203. In the external storage device 203, an application program for using the service in the mobile locker system 100 is held in addition to an OS and the like.

For example, the wireless communication unit 204 is a wireless communication circuit that conforms to a mobile communication system such as 5th generation (5G), 6G, 4G and long term evolution (LTE) or a wireless communication system such as WiMAX and WiFi. The wireless communication unit 204 is connected with the network N1 by wireless communication, and can communicate with the center server 1.

The touch panel display 205 outputs an image in accordance with an instruction from the CPU 201, and outputs a signal input from the user, to the CPU 201.

The position sensor 206 is a sensor that acquires the current position of the user terminal 2. For example, the position sensor 206 is a global positioning system (GPS) receiver, and acquires the latitude and longitude of the place of the user terminal 2.

The hardware configurations of the center server 1 and the user terminal 2 shown in FIG. 2 are examples, and the hardware configurations of the center server 1 and the user terminal 2 are not limited to the hardware configurations shown in FIG. 2. For example, the user terminal 2 includes a microphone, a speaker, a camera and the like as the hardware configuration, in addition to the hardware configuration shown in FIG. 2.

Functional Configuration

Figure 3:
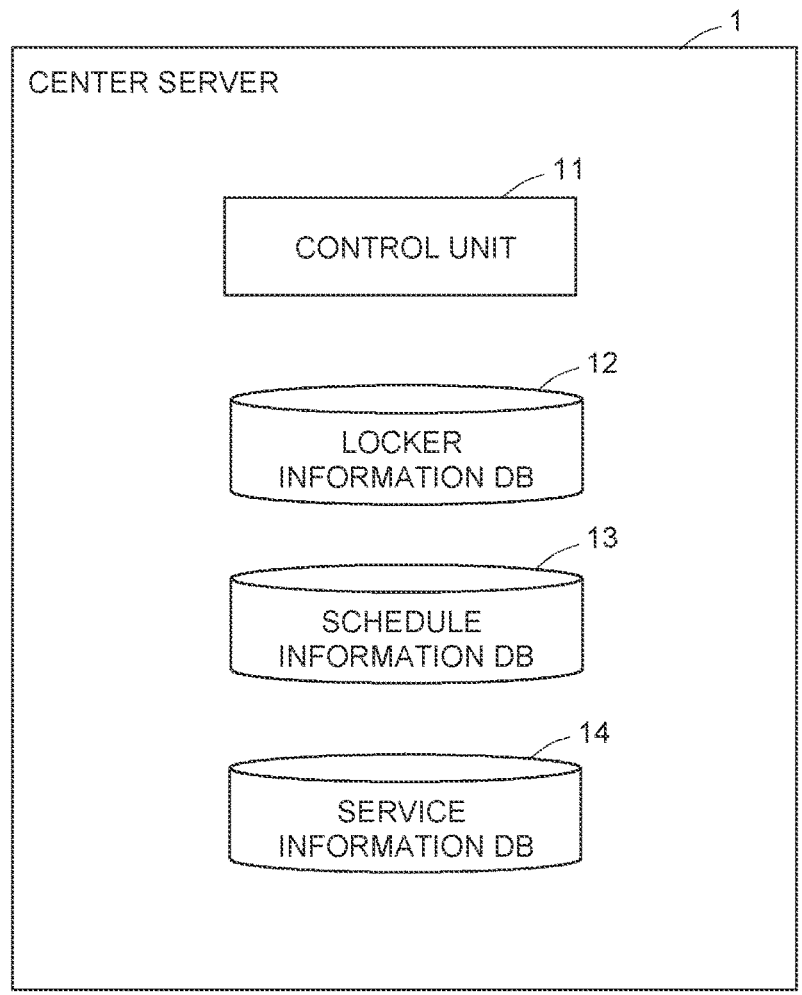
FIG. 3 is a diagram showing examples of functional configurations of the center server and the user terminal.
Figure 3:
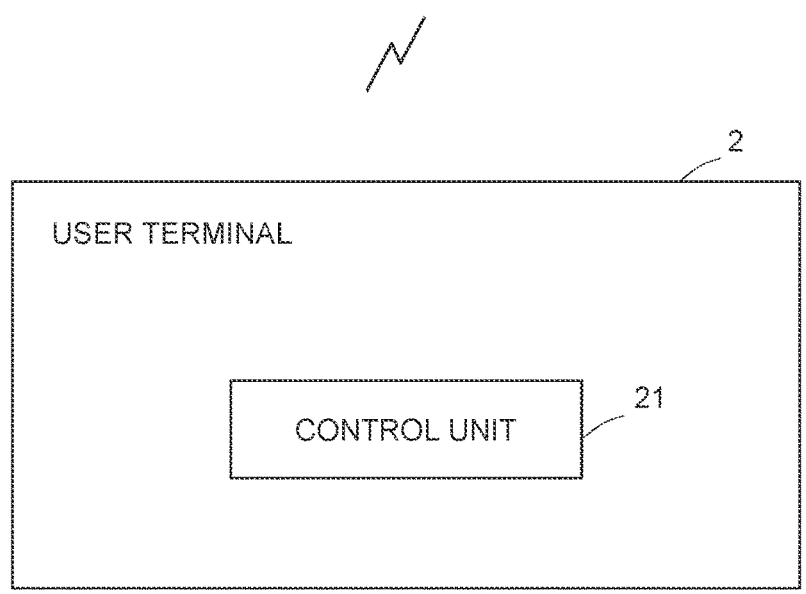

FIG. 3 is a diagram showing examples of functional configurations of the center server 1 and the user terminal 2. The center server 1 includes a control unit 11, a locker information DB 12, a schedule information DB 13 and a service information DB 14, as the functional configuration. The functional constituent elements are achieved, for example, when the CPU 101 of the center server 1 executes the control program for the mobile locker system 100.

The control unit 11 manages the use status of the locker 4, and controls the traveling of the vehicle 3. Specifically, for example, the control unit 11 receives a locker use request, a deposit completion notice, a take-out completion notice and the like from the user terminal 2. The locker use request is a request for the use of the mobile locker. The deposit completion notice is a notice indicating that the deposit of the baggage in the locker 4 has been completed. The take-out completion notice is a notice indicating that the baggage deposited in the locker 4 has been taken out from the locker 4.

When the control unit 11 receives the locker use request from the user terminal 2, the control unit 11 assigns the vehicle 3 and the locker 4. The place at which the baggage is deposited, the date and time at which the baggage is deposited, the place (first place) at which the baggage is taken out, the date and time (first date and time) at which the baggage is taken out, and identification information about the user are sent from the user terminal 2 to the center server 1, together with the locker use request. Hereinafter, the place at which the baggage is deposited and the date and time at which the baggage is deposited are also referred to as a deposit place and a deposit date and time, respectively. Further, the place at which the baggage is taken out and the date and time at which the baggage is taken out are also referred to as the first place and the first date and time, respectively.

For example, the control unit 11 decides the vehicle 3 and the locker 4 that are assigned for the locker use request, by referring to the schedule information DB 13 described later. For example, the vehicle 3 that is assigned for the locker use request is a vehicle that will travel near the deposit place at the deposit date and time and that has a locker 4 including a storage portion for which a plan from the deposit date and time at least to the first date and time has not decided. Further, the locker 4 that is assigned for the locker use request is one of storage portions that are included in the locker 4 mounted on the vehicle 3 and for which a plan from the deposit date and time at least to the first date and time has not decided. The method for deciding the vehicle 3 and the locker 4 that are assigned may be any well-known method, and is not limited to a particular method.

For example, the vehicle 3 and locker 4 in which the baggage is deposited may be designated by the user from position information about the vehicle 3 on a map. In this case, identification information about the vehicle 3 designated by the user is sent from the user terminal 2 to the center server 1, together with the locker use request. The control unit 11 assigns one of storage portions that are included in the locker 4 mounted on the designated vehicle 3 and for which the plan from the deposit date and time at least to the first date and time has not decided, for the received locker use request.

Thereafter, for the service in the received locker use request, the control unit 11 creates a schedule for the assigned vehicle 3 and locker 4, and registers the created schedule in the schedule information DB 13 described later. Further, the control unit 11 creates a traveling scheme for the vehicle 3 based on the schedule created for the assigned vehicle 3, such that the vehicle 3 arrives at the deposit place designated by the user at the deposit data and time designated by the user and arrives at the first place designated by the user at the first date and time designated by the user. The created traveling scheme is sent to the vehicle 3. For example, the traveling scheme includes a destination and arrival date and time for traveling, path information for the destination, and the like.

The control unit 11 sends an answer indicating the agreement to the locker use request, information relevant to the assigned locker 4, the deposit place, and the deposit date and time, to the user terminal 2. For example, the information relevant to the locker 4 includes identification information about the vehicle 3 and identification information about the storage portion of the locker 4. Further, in the first embodiment, it is assumed that the locker 4 employs an electronic lock, and therefore the information relevant to the locker 4 includes authentication information about the storage portion assigned to the user terminal 2. However, the information relevant to the locker 4 is not limited to this. There is a possibility that the storage portion assigned for the locker use request is changed due to the relation to another locker use request. Therefore, the information relevant to the locker 4 may be sent to the user terminal 2 separately from the answer indicating the agreement to the locker use request. For example, at a timing earlier than the deposit date and time by a predetermined time length, the information relevant to the assigned locker 4 may be sent to the user terminal 2.

Further, the control unit 11 sends the first information to the user terminal 2, at the predetermined timing before the first date and time. As described above, the predetermined timing in the first embodiment is a timing that is earlier than the first date and time by the first time length. The first time length is a previously decided time length (for example, several tens of minutes to several hours). As described above, the first information is information for reminding the user about the first plan (the plan in which the user meets the vehicle 3 at the first place at the first date and time and takes out the baggage from the locker 4 of the vehicle 3), and includes the first date and time, the first place, the current position of the vehicle 3, the planned arrival date and time of the vehicle 3 at the first place. The first date and time, the first place and the current position of the vehicle 3 are acquired from the service information DB 14 described later. The planned arrival date and time of the vehicle 3 at the first place is acquired from the schedule information DB 13 described later. In addition to the above information, the first information may include the identification information about the storage portion of the locker 4.

For example, the locker information DB 12, the schedule information DB 13 and the service information DB 14 are created in a storage region of the external storage device 103 of the center server 1. The locker information DB 12 holds the information relevant to the locker 4. The schedule information DB 13 holds the schedule for the locker 4. The service information DB 14 holds service information for the use of the mobile locker. The service information is information relevant to a mobile locker service that is provided for one locker use request. Details of information that is held in the locker information DB 12, the schedule information DB 13 and the service information DB 14 will be described later in detail.

The user terminal 2 includes a control unit 21 as the functional configuration. The process by the control unit 21 is achieved when the CPU 201 of the user terminal 2 executes the application program for the mobile locker system 100 that is held in the external storage device 203. For example, the control unit 21 sends the locker use request, the deposit completion notice, the take-out completion notice, and answers to various inquiries from the center server 1, to the center server 1, in response to inputs to the touch panel display 205 by the user. The control unit 21 receives an answer to the locker use request and information related to the answer, from the center server 1. The control unit 21 receives the first information from the center server 1. In response to a user's operation, the control unit 21 causes a screen to transition, or outputs information received from the center server 1, to the touch panel display 205. The functional configurations of the center server 1 and the user terminal 2 are examples, and are not limited to the functional configurations shown in FIG. 3.

FIG. 4 is an example of the information that is held in the locker information DB 12. The locker information DB 12 holds the information relevant to the locker 4. One record in the locker information DB 12 shown in FIG. 4 shows information relevant to one storage portion of the locker 4. One record in the locker information DB 12 shown in FIG. 4 includes fields for a locker ID, a vehicle ID and authentication information.

In the field for the locker ID, the identification information about the storage portion of the locker 4 is stored. For example, the identification information about the storage portion of the locker 4 is a character string constituted by a predetermined number of alpha-numerals, and includes a higher-order part indicating the locker 4 and a lower-order part indicating the storage portion. The value of the higher-order part that is of the identification information and that indicates the locker 4 is common among a plurality of storage portions that is included in an identical locker 4.

In the field for the vehicle ID, the identification information about the vehicle 3 on which the locker 4 including storage portion is mounted is stored. In the field for the authentication information, the authentication information about the electronic lock provided on the storage portion is stored. The authentication information about the storage portion may be fixed information, or may be variable information. The information that is held in the locker information DB 12 shown in FIG. 4 is an example, and the information that is held in the locker information DB 12 is not limited to the information shown in FIG. 4.

FIG. 5 is an example of the information that is held in the service information DB 14. The service information DB 14 holds the service information. One record in the service information DB 14 shown in FIG. 5 is the service information about the service that is provided for one locker use request. One record in the service information DB 14 shown in FIG. 5 includes fields for a service ID, a user ID, a locker ID, the deposit date and time, the deposit place, the take-out date and time (first date and time), the take-out place (first place), the current position of the vehicle, the predetermined timing, and the take-out completion notice.

In the field for the service ID, the identification information about the service is stored. The identification information about the service is assigned by the control unit 11 in the case where the service provision is established for the received locker use request. In the field for the user ID, the identification information about the user is stored. The identification information about the user is assigned by the control unit 11 when user registration is performed in the mobile locker system 100. The user registration in the mobile locker system 100 is performed through a client application of the mobile locker system 100. In the field for the locker ID, the identification information about the storage portion of the locker 4 assigned to the service is stored.

In the fields for the deposit date and time, the deposit place, the take-out date and time (first date and time) and the take-out place (first place), information indicating the deposit date and time, the deposit place, the first date and time and the first place is stored respectively. Examples of the information indicating the deposit place and the first place include an address, a latitude-longitude, and a landmark name. For example, the deposit date and time and the first date and time is indicated by a year-month-date-hour-minute.

In the field for the current position of the vehicle, information indicating the current position of the vehicle 3 on which the locker 4 assigned to the service is mounted is stored. Examples of the information indicating the current position of the vehicle 3 include an address, a latitude-longitude, and a landmark name.

In the field for the predetermined timing, information indicating a timing at which the first information is sent to the user terminal 2 is stored. In the first embodiment, a year-month-date-hour-minute indicating the date and time earlier than the take-out date and time (first date and time) by the first time length is stored in the field for the predetermined timing.

In the field for the take-out completion notice, information indicating whether the take-out completion notice indicating that the baggage has been taken out from the locker 4 assigned to the service has been received is stored. For example, the information indicating whether the take-out completion notice has been received is shown as a flag, a code or a keyword.

In the case where the locker use request is received from the user terminal 2 and where the service provision is established, the control unit 11 adds a record in the service information DB 14. Along with the addition of the record, the control unit 11 assigns the identification information to the established service, and stores the identification information in the field for the service ID. Further, the identification information about the storage portion of the locker 4 assigned by the control unit 11 is stored in the field for the locker ID. Further, in the fields for the user ID, the deposit date and time, the deposit place, the take-out date and time (first date and time) and the take-out place (first place), the identification information about the user, the deposit date and time, the deposit place, the first date and time and the first place, which are received from the user terminal 2 together with the locker use request, are stored by the control unit 11, respectively.

The control unit 11 periodically acquires the current position of the vehicle 3. Whenever the control unit 11 acquires the current position of the vehicle 3, the control unit 11 updates the information stored in the field for the current position of the vehicle 3. In the case where the locker use request is received from the user terminal 2 and where the service provision is established, the control unit 11 computes the predetermined timing by subtracting the first time length from the take-out date and time received from the user terminal 2. The control unit 11 stores the computed predetermined timing in the field for the predetermined timing.

An initial value of the field for the take-out completion notice is information indicating that the take-out completion notice has not been received. When the take-out completion notice has been received from the user terminal 2, the control unit 11 updates the field for the take-out completion notice to information indicating that the take-out completion notice has been received. The information that is held in the service information DB 14 is not limited to the information shown in FIG. 5.

Figure 6:
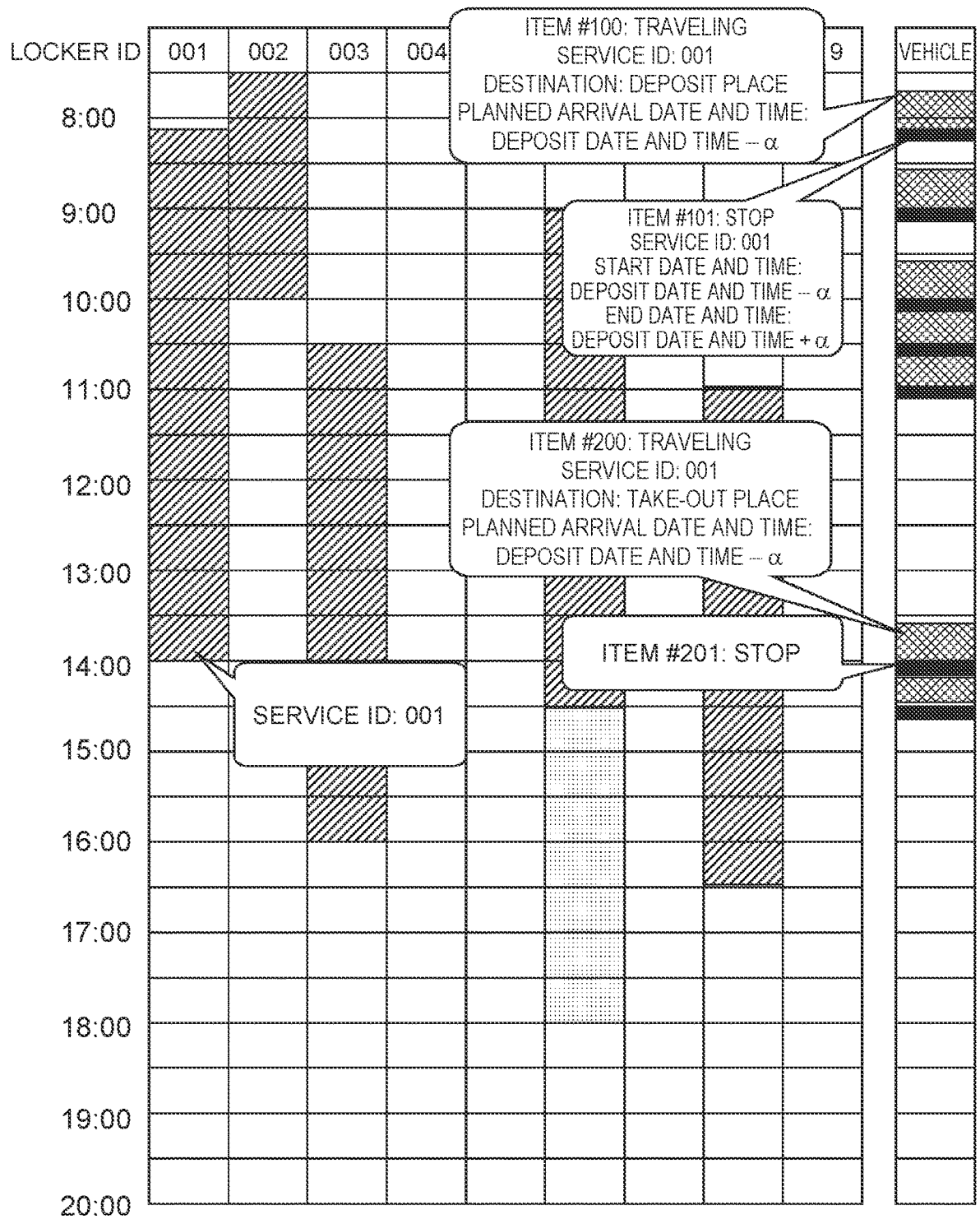
FIG. 6 is an example of information that is held in a schedule information DB.

FIG. 6 is an example of the information that is held in the schedule information DB 13. In the schedule information DB 13, schedules for the locker 4 and the vehicle 3 are stored. In the example shown in FIG. 6, schedules for one vehicle 3 and the storage portions of the locker 4 mounted on the vehicle 3 in business hours on a certain day are shown.

In the example shown in FIG. 6, a storage portion with locker ID: 001 is assigned to a service with service ID: 001, and is reserved from 8:15 to 17:00. In the service with service ID: 001, the deposit date and time is set to 8:15, and the take-out date and time (first date and time) is set to 14:00.

In the example shown in FIG. 6, the schedule for the vehicle 3 is set depending on the reservation for each storage portion. An item #100, an item #101, an item #200 and an item #201 are set as schedule items for the vehicle 3 that correspond to the service with service ID: 001 assigned to the storage portion with locker ID: 001.

The item #100 and the item #101 are schedule items that correspond to the deposit of the baggage in the service with service ID: 001. The item #100 is an item for a traveling event of the vehicle 3. In the item #100, a deposit place with service ID: 001 is set as a destination of the traveling, and a date and time of a deposit date and time with service ID: 001−α is set as a planned arrival date and time of the vehicle 3 at the deposit place. The item #101 is an item for an event of a stop of the vehicle 3. The event of the stop of the vehicle 3 in the item #101 is an event in which the user deposits the baggage in the locker 4. A sequence of actions when the user deposits the baggage in the locker 4 includes the getting on the vehicle 3, the deposit of the baggage in the storage portion, the locking of the storage portion and the getting off the vehicle 3. For executing the sequence of actions, the vehicle 3 needs to be in the stop state for a sufficient time length. Accordingly, in the item #101, the date and time of the deposit date and time with service ID: 001−α is set as a start date and time of the vehicle stop, and a date and time of the deposit date and time with service ID: 001+α is set as an end date and time of the vehicle stop.

A traveling scheme that is set for the vehicle 3 and that corresponds to the item #100 and the item #101 is a traveling scheme indicating that the vehicle 3 travels to the deposit place by the deposit date and time−α and is in the stop state at the deposit place from the deposit date and time−α to the deposit date and time+α.

The item #200 and the item #201 are schedule items that correspond to the take-out of the baggage in the service with service ID: 001. The item #200 is an item for a traveling event of the vehicle 3. In the item #200, a take-out place (first place) with service ID: 001 is set as a destination of the traveling, and a date and time of a take-out date and time with service ID: 001−α is set as a planned arrival date and time of the vehicle 3 at the take-out place (first place). The item #201 is an item for an event of a stop of the vehicle 3. The event of the stop of the vehicle 3 in the item #201 is an event in which the user takes out the baggage from the locker 4. A sequence of actions when the user takes out the baggage from the locker 4 includes the getting on the vehicle 3, the unlocking of the storage portion, the take-out of the baggage from the storage portion and the getting off the vehicle 3. Accordingly, in the item #201, the date and time of the take-out date and time (first date and time) with service ID: 001−α is set as a start date and time of the vehicle stop, and a date and time of the take-out date and time (first date and time) with service ID: 001+α is set as an end date and time of the vehicle stop.

A traveling scheme that is set for the vehicle 3 and that corresponds to the item #200 and the item #201 is a traveling scheme in which the vehicle 3 travels to the take-out place (first place) by the take-out date and time (first date and time)−α and is in the stop state at the take-out place (first place) from the take-out date and time (first date and time)−α to the take-out date and time (first date and time)+α.

In a blank period of the schedule for the vehicle 3, for example, the control unit 11 causes the vehicle 3 to travel along a path that matches with schedules before and after the blank period. The control unit 11 refers to the schedule information DB 13, and performs the assignment of the locker 4, the proposal of the first place and the first date and time, and the like. The information that is held in the schedule information DB 13 is not limited to the information shown in FIG. 6.

Example of Screen of User Terminal

Figure 7:
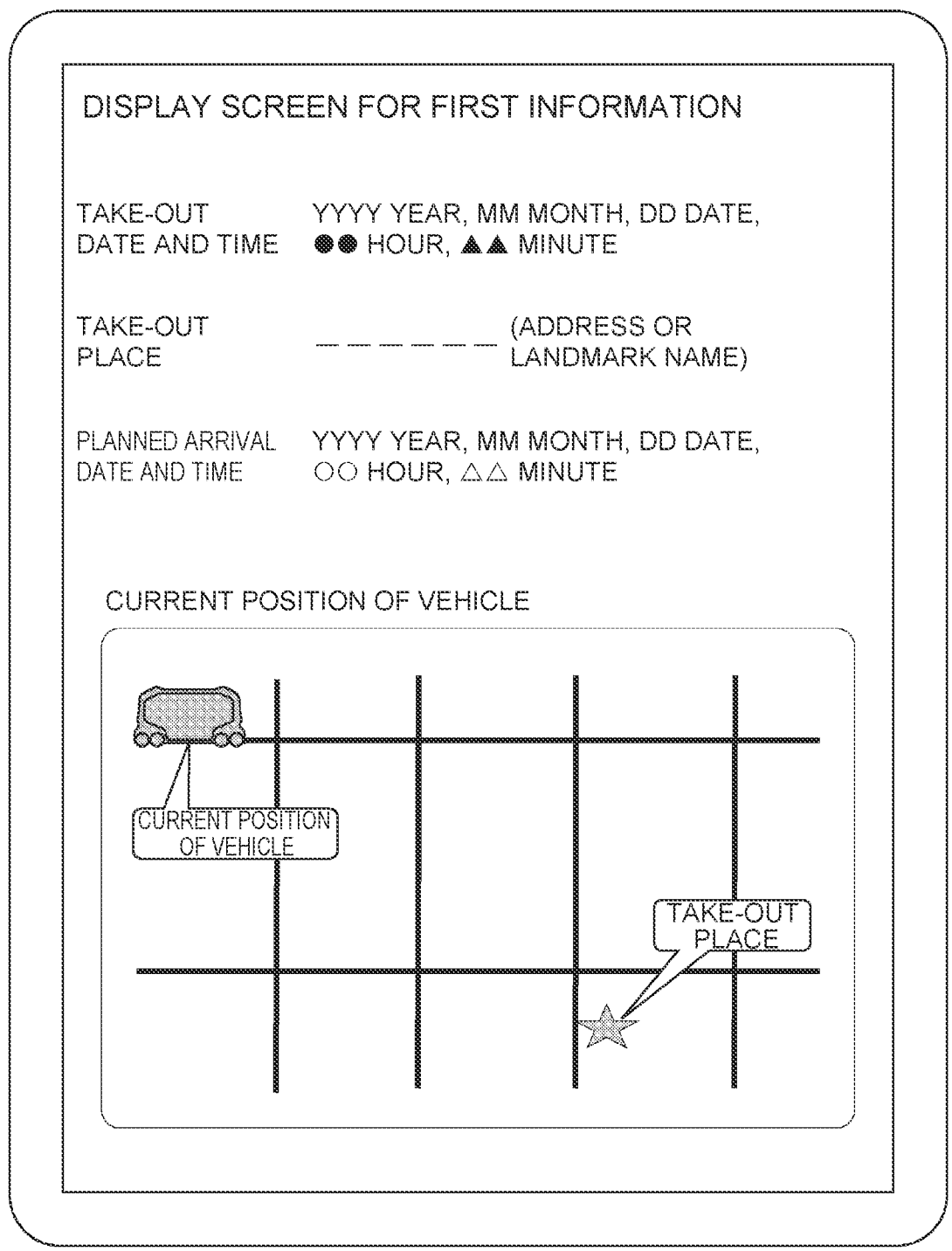
FIG. 7 is an example of a first information display screen on the user terminal.

FIG. 7 is an example of a screen of the user terminal 2 by the client application of the mobile locker system 100. FIG. 7 is an example of a first information display screen on the user terminal 2. The display screen for the first information is a screen that presents, to the user, the information for reminding the user about the first plan (the plan in which the user meets the vehicle 3 at the first place at the first date and time and takes out the baggage from the locker 4 mounted on the vehicle 3). The display screen for the first information is displayed when the user terminal 2 receives the first information from the center server 1.

In the example shown in FIG. 7, the display screen for the first information includes information indicating the take-out date and time, the take-out place, the planned arrival date and time, and the current position of the vehicle 3. The take-out date and time is character information indicating the year-month-date-hour-minute of the first date and time that has been designated by the user at the time of the locker use request. The take-out place is character information indicating the address, latitude-longitude or landmark indicating the first place that has been designated by the user at the time of the locker use request. The planned arrival date and time is character information indicating the year-month-date-hour-minute of the date and time at which the vehicle 3 is planned to arrive at the first place.

The current position of the vehicle 3 is information indicating the current position of the vehicle 3 on the map. In the example shown in FIG. 7, as the information indicating the current position of the vehicle 3, the first place on the map is also shown, in addition to the current position of the vehicle 3 on the map. Thereby, the user can know the current position of the vehicle 3 on the basis of the first place. Further, on the map, the current position of the user (the current position of the user terminal 2) may be displayed, in addition to the current position of the vehicle 3 and the first place. In this case, the user refers to the first place and the current position of the user (the current position of the user terminal 2) displayed on the map, and thereby can know a movement path from the current position of the user to the first place, and the time required for the movement.

The configuration of the display screen for the first information is not limited to the example shown in FIG. 7.

Flow of Process

Figure 8:
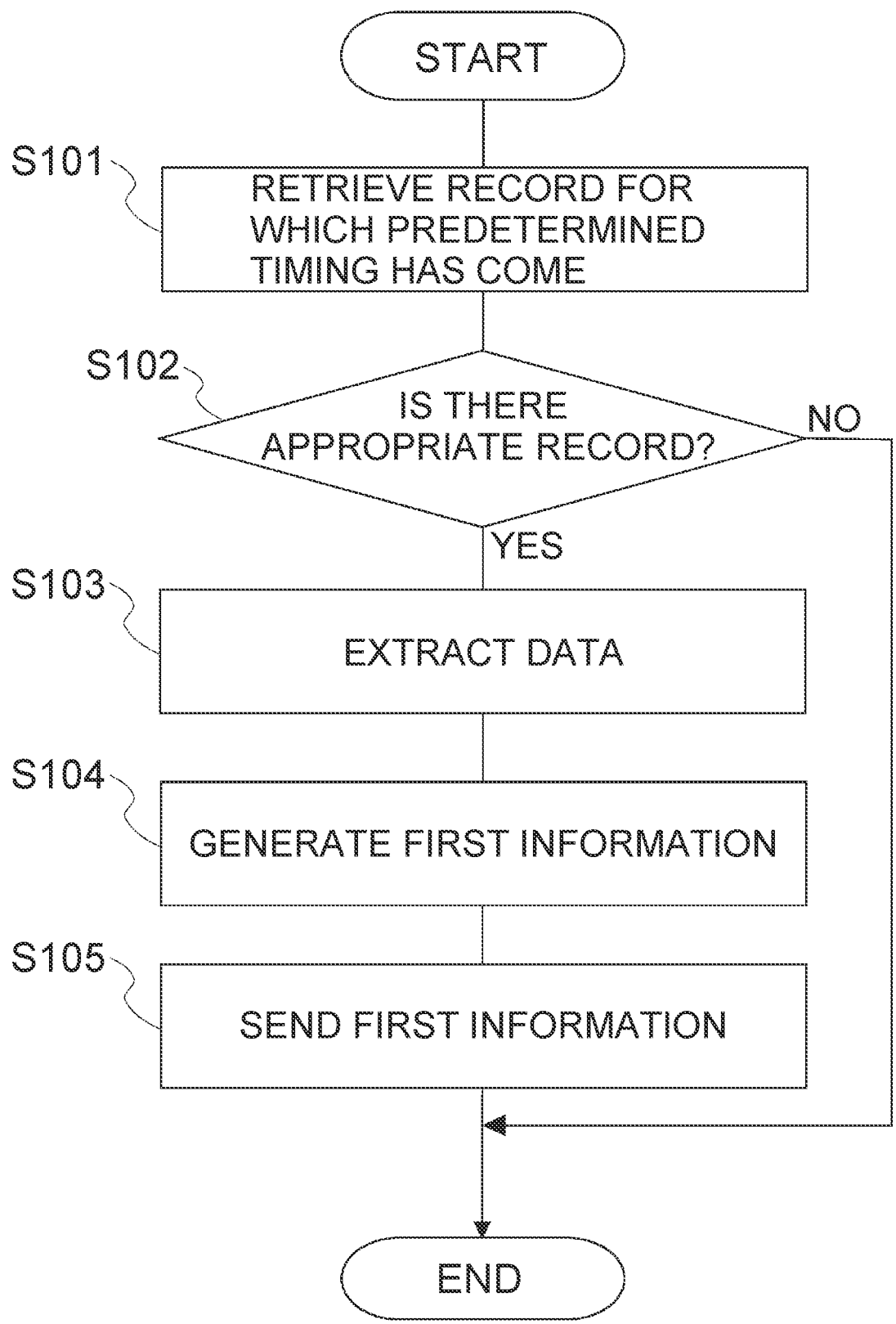
FIG. 8 is an example of a flowchart of a process that is executed in the center server with a predetermined period in the first embodiment.

FIG. 8 is an example of a flowchart of a process that is repeatedly executed in the center server 1 with a predetermined period (for example, several minutes to several tens of minutes). A subject that executes the process shown in FIG. 8 is the CPU 101 of the center server 1. However, for convenience sake, descriptions will be made assuming that the subject is a functional constituent element.

In FIG. 8, the control unit 11 of the center server 1 accesses the service information DB 14, and retrieves a record for which the predetermined timing has come (step S101). For example, the control unit 11 retrieves a record for which the date and time stored in the field for the predetermined timing coincides with the current date and time or is close to the current date and time (for example, is earlier or later than the current date and time by several minutes or several tens of minutes), from the records registered in the service information DB 14. After the execution of the process of step S101, the control unit 11 executes the process of step S102.

In step S102, the control unit 11 determines whether there is an appropriate record. That is, the control unit 11 determines whether there is a record for which the predetermined timing has come (a record for which the date and time stored in the field for the predetermined timing coincides with the current date and time or is close to the current date and time), among the records registered in the service information DB 14. In the case where there is no appropriate record among the records registered in the service information DB 14 (the negative determination in step S102), the process shown in FIG. 8 is ended. In the case where there is an appropriate record among the records registered in the service information DB 14 (the positive determination in step S102), the process proceeds to step S103.

In step S103, the control unit 11 extracts a variety of data necessary to generate the first information, from the service information DB 14 and the schedule information DB 13. For example, the control unit 11 extracts the information stored in the fields for the service ID, the take-out date and time (first date and time), the take-out place (first place) and the current position of the vehicle 3, from the appropriate record in the service information DB 14. Further, the control unit 11 accesses the schedule information DB 13 using the service ID extracted from the appropriate record in the service information DB 14 as an argument, and thereby extracts the planned arrival date and time of the vehicle 3 at the take-out place (first place), from a schedule item (for example, the item #200 in FIG. 6) for the service corresponding to the above service ID. After the execution of the process of step S103, the control unit 11 executes the process of step S104.

In step S104, the control unit 11 generates the first information based on the data extracted in step S103. As described above, the first information is information including the first date and time, the first place, the current position of the vehicle 3, and the planned arrival date and time of the vehicle 3 at the first place. After the execution of the process of step S104, the control unit 11 executes the process of step S105.

In step S105, the control unit 11 sends the first information generated in step S104, to the user terminal 2. The user terminal 2 that is the sending destination of the first information is a terminal that is used by the user that has performed the locker use request corresponding to the appropriate record in the service information DB 14. After the execution of the process of step S105, the process in FIG. 8 ends.

The user terminal 2 receives the first information from the center server 1, and the control unit 21 outputs the screen shown in FIG. 6, on the touch panel display 205, so that the first information is presented to the user. Thereby, it is possible to remind the user about the first plan (the plan in which the user meets the vehicle 3 at the first place at the first date and time and takes out the baggage from the locker 4 mounted on the vehicle 3), at the predetermined timing before the first date and time. When the control unit 21 of the user terminal 2 outputs the screen shown in FIG. 6 on the touch panel display 205, the control unit 21 of the user terminal 2 may output a notice sound from the speaker of the user terminal 2. Thereby, it is possible to more surely cause the user to recognize the first plan.

Function Effect of First Embodiment

In the first embodiment, the first information is sent to the user terminal 2, at the predetermined timing before the first date and time designated by the user that performs the locker use request. Thereby, even when the user forgets the first plan (the plan in which the user meets the vehicle 3 at the first place at the first date and time and takes out the baggage from the locker 4 mounted on the vehicle 3), it is possible to remind the user about the first plan before the first date and time. As a result, it is possible to help the user to not forget to take out the baggage from the locker 4 of the vehicle 3 at the first place at the first date and time.

Further, in the first embodiment, the first information including the first place, the current position of the vehicle 3 and the planed arrival date and time of the vehicle 3 at the first place in addition to the first date and time is presented to the user. Thereby, the user can move to the first place in consideration of the current position of the vehicle 3 and the planned arrival date and time.

Further, in the case where the first information includes the identification information about the storage portion of the locker 4, in addition to the first date and time, the first place, the current position of the vehicle 3 and the planned arrival date and time of the vehicle 3 at the first place, even when the user forgets the storage portion in which the user has deposited the baggage, it is possible to remind the user about the appropriate storage portion.

Modification 1 of First Embodiment

The first time length that is used for the decision of the predetermined timing may be changed depending on the distance between the first place and the position of the user terminal 2. For example, the control unit 11 of the center server 1 may set the first time length such that the first time length is longer as the distance between the first place and the position of the user terminal 2 is longer.

In the modification, the control unit 11 acquires the position information about the user terminal 2, at a timing (also referred to as an "acquisition timing" hereinafter) that is earlier than the first date and time by a time length resulting from adding a margin to the initial value of the first time length. The position information about the user terminal 2 is information indicating the current position that is acquired by the position sensor 206 of the user terminal 2. For acquiring this position information, the control unit 11 may send a position information demand signal to the user terminal 2 at the acquisition timing. In the user terminal 2, which receives the position information demand signal, the control unit 21 may acquire the current position about the user terminal 2 through the position sensor 206, and may send the position information indicating the acquired current position, to the center server 1.

The control unit 11 computes the distance between the current position of the user terminal 2 and the first place, based on the position information acquired by the above method. In the case where the computed distance is longer than a reference value, the control unit 11 sets the first time length to a time length resulting from adding a first correction value to the initial value of the first time length. For example, the reference value is the maximum of a distance by which the user is estimated to be capable of moving within the initial value of the first time length. For example, the first correction value is set to a larger value as the difference between the distance between the current position of the user terminal 2 and the first place and the reference value is larger.

In the case where the distance between the current position of the user terminal 2 and the first place is shorter than the reference value, the control unit 11 sets the first time length to a time length resulting from subtracting a second correction value from the initial value of the first time length. For example, the second correction value is set to a larger value as the difference between the distance between the position of the user terminal 2 and the first place and the reference value is larger.

In the case where the distance between the current position of the user terminal 2 and the first place is equal to the reference value, the control unit 11 sets the first time length to the initial value of the first time length.

In the modification, the first time length is set such that the first time length is longer as the distance between the current position of the user terminal 2 and the first place is longer. Thereby, the predetermined timing becomes an earlier timing as the distance between the current position of the user terminal 2 and the first place is longer. That is, the first information is sent from the center server 1 to the user terminal 2 at an earlier timing, as the current position of the user terminal 2 is more distant from the first place.

With the modification, it is possible to remind the user about the first plan (the plan in which the user meets the vehicle 3 at the first place at the first date and time and takes out the baggage from the locker 4 mounted on the vehicle 3) at an earlier timing, as the current position of the user is more distant from the first place. Thereby, even when the user is at a place that is distant from the first place, the user can move to the first place by the first date and time. As a result, the user can take out the baggage from the locker 4 by the first date and time.

Modification 2 of First Embodiment

The first time length that is used for the decision of the predetermined timing may be arbitrarily designated by the user. For example, when the user performs the locker use request, the user may designate the first time length, in addition to the deposit place, the deposit date and time, the first place and the first date and time. In this case, the control unit 21 of the user terminal 2 may send the information about the first time length to the center server 1, in addition to the deposit place, the deposit date and time, the first place and the first date and time, which are designated by the user, together with the locker use request.

The control unit 11 of the center server 1 may set the predetermined timing based on the information about the first time length received together with the locker use request. For example, the control unit 11 may set the predetermined timing to a timing that is earlier than the first date and time by the first time length designated by the user.

With the modification, the user can receive the presentation of the first information at an arbitrary timing.

Second Embodiment

A second embodiment of the present disclosure will be described based on FIG. 9 and FIG. 10. For the second embodiment, different configurations from the above-described first embodiment will be described, and descriptions of the same configurations as the first embodiment will be omitted.

In the example described in the first embodiment, the predetermined timing is set to the timing that is earlier than the first date and time by the first time length. In the second embodiment, as an example, the predetermined timing is set to a timing that is equal to or later than a date and time earlier than the first date and time by a second time length and at which a distance Ds1 between the current position of the vehicle 3 and the first place becomes equal to or shorter than a first distance Thr1.

FIG. 9 is an example of information that is held in the service information DB 14 in the second embodiment. One record in the service information DB 14 shown in FIG. 9 includes fields for the service ID, the user ID, the locker ID, the deposit date and time, the deposit place, the take-out date and time (first date and time), the take-out place (first place), the current position of the vehicle, a second date and time and the take-out completion notice.

The information that is stored in the fields for the service ID, the user ID, the locker ID, the deposit date and time, the deposit place, the take-out date and time (first date and time), the take-out place (first place), the current position of the vehicle and the take-out completion notice is the same as the information in the first embodiment (FIG. 5). In the field for the second date and time, a year-month-date-hour-minute indicating the date and time (second date and time) earlier than the first date and time by the second time length is stored. The second time length may be equal to the first time length in the first embodiment, may be longer than the first time length, or may be shorter than the first time length.

In the case where the locker use request is received from the user terminal 2 and where the service provision is established, the control unit 11 computes the second date and time by subtracting the second time length from the first date and time received from the user terminal 2. The control unit 11 stores the computed second date and time in the field for the second date and time.

Flow of Process

Figure 10:
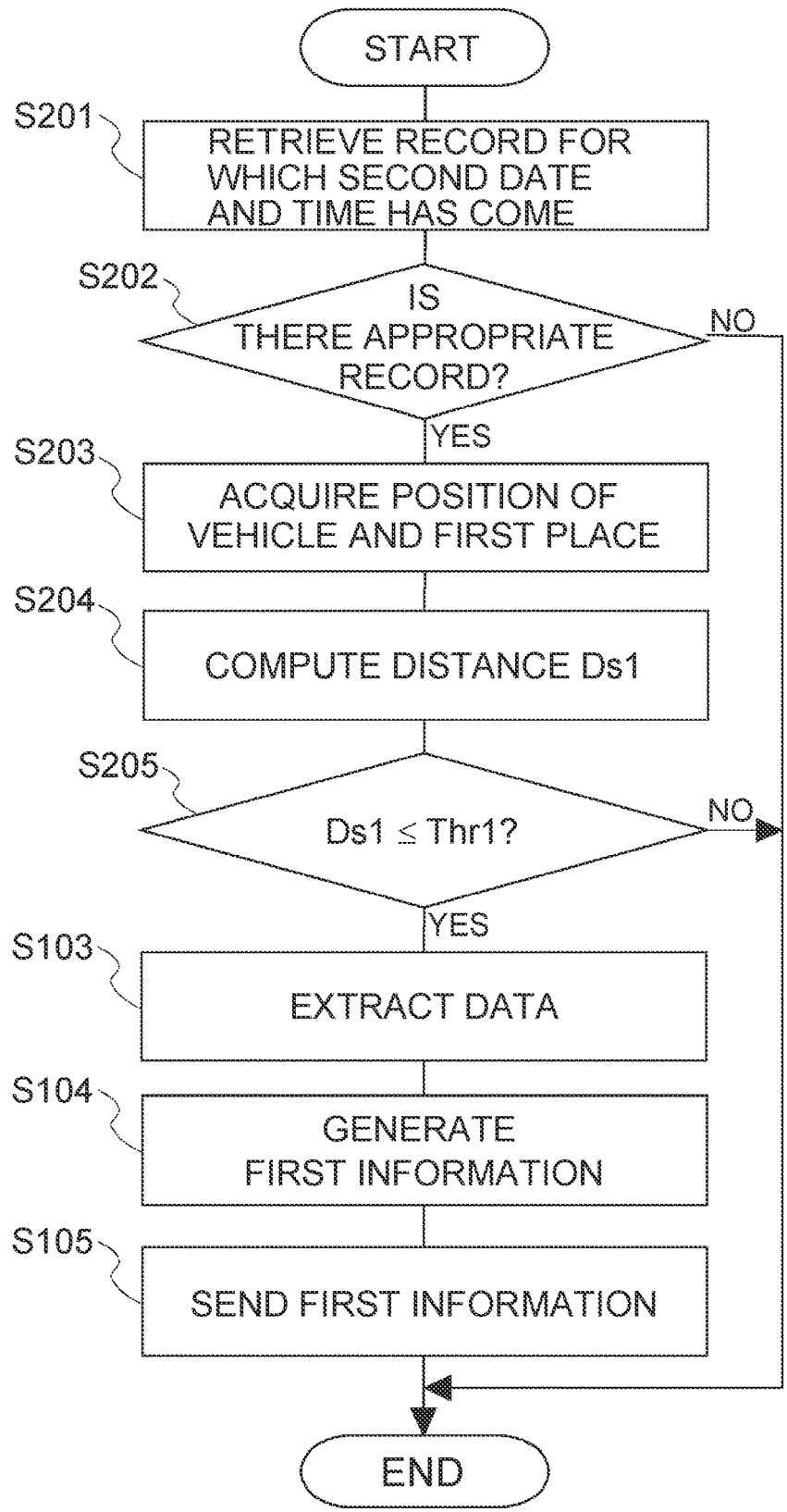
FIG. 10 is an example of a flowchart of a process that is executed in a center server with a predetermined period in the second embodiment.

FIG. 10 is an example of a flowchart of a process that is repeatedly executed in the center server 1 with a predetermined period. In FIG. 10, the same processes as processes in FIG. 8 are denoted by the same reference characters as reference characters in FIG. 8.

In the flowchart of FIG. 10, the processes of steps S201 to S205 are executed instead of the processes of steps S101 to S102 in the flowchart of FIG. 8. Similarly to FIG. 8, a subject that executes the process shown in FIG. 10 is the CPU 101 of the center server 1. However, for convenience sake, descriptions will be made assuming that the subject is a functional constituent element.

In step S201, the control unit 11 of the center server 1 accesses the service information DB 14, and retrieves a record for which the second date and time has come. For example, the control unit 11 retrieves a record for which the date and time stored in the fields for the second date and time coincides with the current date and time or is earlier than the current date and time, from the records registered in the service information DB 14. After the execution of the process of step S201, the control unit 11 executes the process of step S202.

In step S202, the control unit 11 determines whether there is an appropriate record. That is, the control unit 11 determines whether there is a record for which the date and time stored in the field for the second date and time coincides with the current date and time or is earlier than the current date and time, among the records registered in the service information DB 14. In the case where there is no appropriate record among the records registered in the service information DB 14 (the negative determination in step S202), the process shown in FIG. 10 is ended. In the case where there is an appropriate record among the records registered in the service information DB 14 (the positive determination in step S202), the process proceeds to step S203.

In step S203, the control unit 11 acquires the current position of the vehicle 3 and the first place. Specifically, the control unit 11 extracts the information stored in the field for the current position of the vehicle in the appropriate record in the service information DB 14 and the information stored in the field for the take-out place (first place) in the appropriate record. After the execution of the process of step S203, the control unit 11 executes the process of step S204.

In step S204, the control unit 11 computes the distance Ds1 between the current position of the vehicle 3 and the first place, based on the information acquired in step S203. After the execution of the process of step S204, the control unit 11 executes the process of step S205.

In step S205, the control unit 11 determines whether the distance Ds1 computed in step S204 is equal to or shorter than the first distance Thr1. In the case where the distance Ds1 is longer than the first distance Thr1 (the negative determination in step S205), the process in FIG. 10 is ended. In the case where the distance Ds1 is equal to or shorter than the first distance Thr1 (the positive determination in step S205), the control unit 11 executes the processes of steps S103 to S105.

Function Effect of Second Embodiment

In the second embodiment, even when the distance Ds1 between the current position of the vehicle 3 and the first place becomes equal to or shorter than the first distance Thr1 before the second date and time (the date and time earlier than the first date and time by the second time length), the first information is not sent from the center server 1 to the user terminal 2 until the second date and time or later. As a result, even when the vehicle 3 comes close to the first place at an excessively early timing relative to the first date and time, it is possible to prevent the first information from being sent from the center server 1 to the user terminal 2.

Third Embodiment

A third embodiment of the present disclosure will be described based on FIG. 11 and FIG. 12. For the third embodiment, different configurations from the above-described first embodiment will be described, and descriptions of the same configurations as the first embodiment will be omitted.

In the example described in the first embodiment, the predetermined timing is set to the timing that is earlier than the first date and time by the first time length. In the third embodiment, as an example, the predetermined timing is set to a timing that is equal to or later than a date and time earlier than the first date and time by a third time length and at which a distance Ds2 between the current position of the user and the first place becomes equal to or shorter than a second distance Thr2.

FIG. 11 is an example of information that is held in the service information DB 14 in the third embodiment. One record in the service information DB 14 shown in FIG. 11 includes fields for the service ID, the user ID, the locker ID, the deposit date and time, the deposit place, the take-out date and time (first date and time), first place, the current position of the user, a third date and time and the take-out completion notice.

The information that is stored in the fields for the service ID, the user ID, the locker ID, the deposit date and time, the deposit place, the take-out date and time (first date and time), the take-out place (first place) and the take-out completion notice is the same as the information in the first embodiment (FIG. 5). In the field for the current position of the user, information indicating the current position of the user terminal 2 is stored as information indicating the current position of the user. In the field for the third date and time, a year-month-date-hour-minute indicating the date and time (third date and time) earlier than the first date and time by the third time length is stored. The third time length may be equal to the first time length in the first embodiment, may be longer than the first time length, or may be shorter than the first time length.

In the case where the locker use request is received from the user terminal 2 and where the service provision is established, the control unit 11 computes the third date and time by subtracting the third time length from the take-out date and time received from the user terminal 2. The control unit 11 stores the computed third date and time in the field for the third date and time. Further, the control unit 11 periodically sends the position information demand signal to the user terminal 2, and thereby periodically acquires the position information acquired by the position sensor 206 of the user terminal 2. The control unit 11 updates the information stored in the field for the current position of the user, whenever the control unit 11 acquires the position information from the user terminal 2.

Flow of Process

Figure 12:
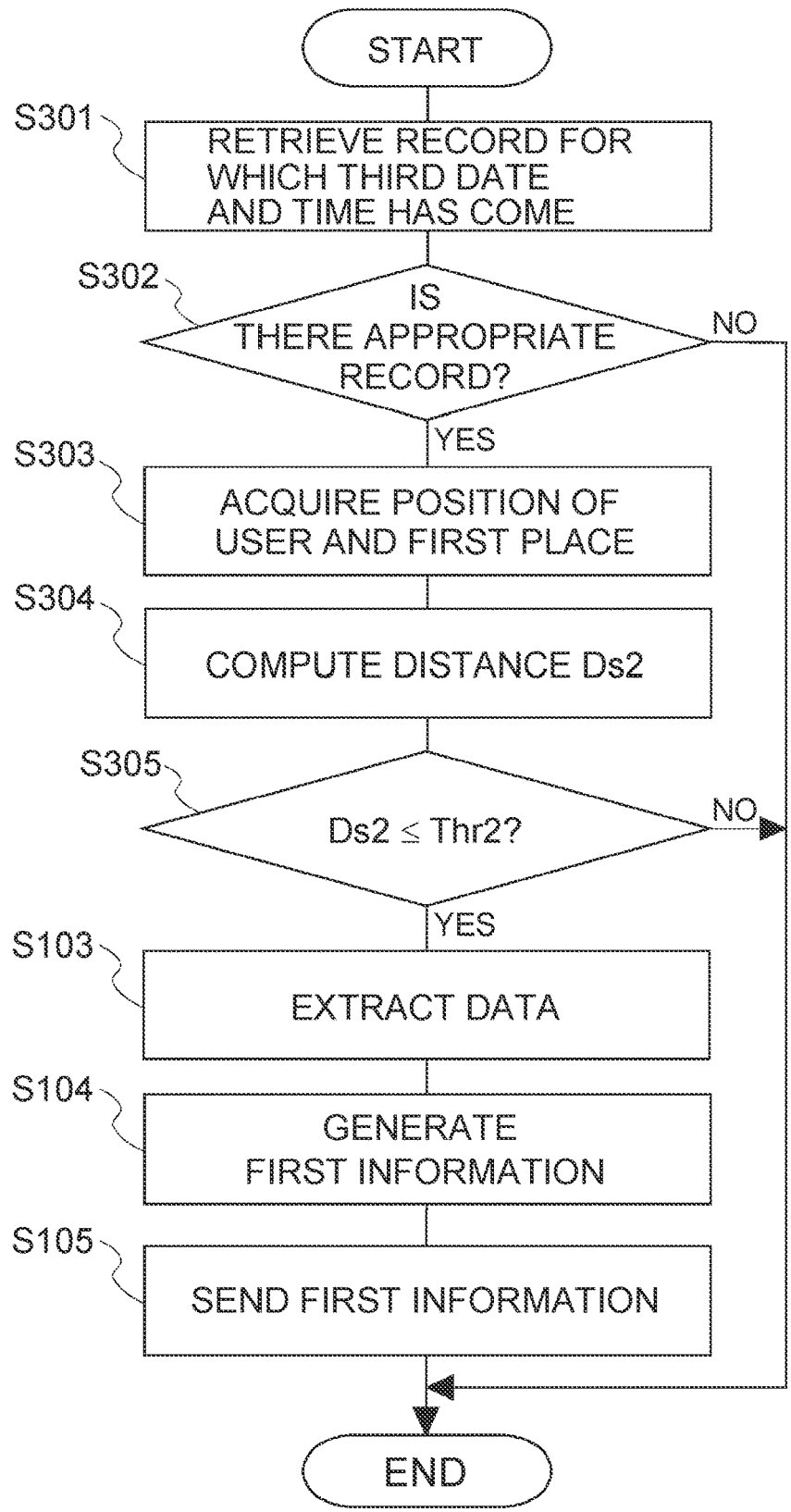
FIG. 12 is an example of a flowchart of a process that is executed in a center server with a predetermined period in the third embodiment.

FIG. 12 is an example of a flowchart of a process that is repeatedly executed in the center server 1 with a predetermined period. In FIG. 12, the same processes as processes in FIG. 8 are denoted by the same reference characters as reference characters in FIG. 8.

In the flowchart of FIG. 12, the processes of steps S301 to S305 are executed instead of the processes of steps S101 to S102 in the flowchart of FIG. 8. Similarly to FIG. 8, a subject that executes the process shown in FIG. 12 is the CPU 101 of the center server 1. However, for convenience sake, descriptions will be made assuming that the subject is a functional constituent element.

In step S301, the control unit 11 of the center server 1 accesses the service information DB 14, and retrieves a record for which the third date and time has come. For example, the control unit 11 retrieves a record for which the date and time stored in the fields for the third date and time coincides with the current date and time or is earlier than the current date and time, from the records registered in the service information DB 14. After the execution of the process of step S301, the control unit 11 executes the process of step S302.

In step S302, the control unit 11 determines whether there is an appropriate record. That is, the control unit 11 determines whether there is a record for which the date and time stored in the field for the third date and time coincides with the current date and time or is earlier than the current date and time, among the records registered in the service information DB 14. In the case where there is no appropriate record among the records registered in the service information DB 14 (the negative determination in step S302), the process shown in FIG. 12 is ended. In the case where there is an appropriate record among the records registered in the service information DB 14 (the positive determination in step S302), the process proceeds to step S303.

In step S303, the control unit 11 acquires the current position of the user (the current position of the user terminal 2) and the first place. Specifically, the control unit 11 reads the information stored in the field for the current position of the user in the appropriate record in the service information DB 14 and the information stored in the field for the take-out place (first place) in the appropriate record. After the execution of the process of step S303, the control unit 11 executes the process of step S304.

In step S304, the control unit 11 computes the distance Ds2 between the current position of the user (the current position of the user terminal 2) and the first place, based on the information acquired in step S303. After the execution of the process of step S304, the control unit 11 executes the process of step S305.

In step S305, the control unit 11 determines whether the distance Ds2 computed in step S304 is equal to or shorter than the second distance Thr2. In the case where the distance Ds2 is longer than the second distance Thr2 (the negative determination in step S305), the process in FIG. 12 is ended. In the case where the distance Ds2 is equal to or shorter than the second distance Thr2 (the positive determination in step S305), the control unit 11 executes the processes of steps S103 to S105.

Function Effect of Third Embodiment

In the third embodiment, even when the distance Ds2 between the current position of the user and the first place becomes equal to or shorter than the second distance Thr2 before the third date and time (the date and time earlier than the first date and time by the third time length), the first information is not sent from the center server 1 to the user terminal 2 until the third date and time or later. As a result, even when the user comes close to the first place at an excessively early timing relative to the first date and time, it is possible to prevent the first information from being sent from the center server 1 to the user terminal 2.

OTHER EMBODIMENTS

The above embodiments are just examples, and the present disclosure can be carried out while being appropriately modified without departing from the spirit of the present disclosure. For example, the function of the center server 1 may be realized by an application program that is installed in the user terminal 2. In this case, the application program may be configured to output the first information on the touch panel display 205 of the user terminal 2 at a predetermined timing. Thereby, it is possible to obtain the same function effects as those in the above-described embodiments.

The processes and structure described in the present disclosure can be carried out while being freely combined as long as there is no technical inconsistency. For example, in the first to third embodiments, the predetermined timing is previously decided to one of the following (1) to (3). However, it is allowable to adopt a configuration in which the user can arbitrarily designate one of the following (1) to (3) when the user performs the locker use request.

(1) The timing that is earlier than the first date and time by the first time length
(2) The timing that is equal to or later than the date and time earlier than the first date and time by the second time length and at which the distance between the current position of the vehicle 3 and the first place becomes equal to or shorter than the first distance
(3) The timing that is equal to or later than the date and time earlier than the first date and time by the third time length and at which the distance between the position of the user terminal 2 and the first place becomes equal to or shorter than the second distance In the configuration in which the user arbitrarily designates the predetermined timing, when the user performs the locker use request, a scree shown in FIG. 13 may be displayed on the touch panel display 205 of the user terminal 2. The screen in FIG. 13 is an example of a locker use request screen. The locker use request screen is a screen for performing the request for the use of the mobile locker service. For example, the locker use request screen is displayed when the user selects "locker use request" from a menu of the client application in the mobile locker system 100.

The locker use request screen shown in FIG. 13 includes entry fields for the deposit place, the deposit date and time, the take-out place (first place) and the take-out date and time (first date and time), entry field for the notice timing, and a button for the locker use request.

Each of the entry fields for the deposit place and the take-out place includes radio buttons for selecting one of "retrieval with keyword", "selection from map" and "selection from registered addresses", as a designation method. When "retrieval with keyword" is selected, a retrieval result about an input keyword is displayed, and the deposit place or the take-out place can be selected from the retrieval result. As the retrieval result about the keyword, for example, a geographical name, a station name, a building name, an address and the like are displayed. When "selection from map" is selected, the screen transitions to a display screen for a map, and the deposit place or the take-out place can be set on the map. When "selection from registered addresses"

is selected, a list of registered addresses is displayed, and the deposit place or the take-out place can be selected from the list.

Each of the entry fields for the deposit date and time and the take-out date and time includes pull-down menus for selecting month, date, hour and minute. The selection of minute may be designated in units of 5 minutes, 10 minutes, 15 minutes or 30 minutes, for example.

The entry field for the notice timing includes a pull-down menu for designating one of the above (1) to (3) as the predetermined timing.

When the "request start" button is selected, the control unit 21 of the user terminal 2 accepts a user's operation for the locker use request, and sends the locker use request to the center server 1. The user terminal 2 sends the deposit place, the deposit date and time, the take-out place, the take-out date and time, the predetermined timing that are input on the locker use request screen, and the user identification information, to the center server 1, together with the locker use request.

In the configuration in which the user arbitrarily designates the predetermined timing, the user can receive the presentation of the first information at an arbitrary timing. For example, the user can receive the presentation of the first information at a timing suitable for the life pattern or schedule of the user.

Further, a process that is executed by a single device in the above description may be executed by a plurality of devices in cooperation. Alternatively, processes that are executed by different devices in the above description may be executed by a single device. In the computer system, the hardware configuration (server configuration) that realizes each function can be flexibly changed.

The present disclosure can be realized also by supplying a computer program having the functions described in the above embodiments to a computer and causing one or more processor included in the computer to read and execute the program. This computer program may be provided to the computer by a non-transitory computer-readable storage medium that can be connected with a system bus of the computer, or may be provided to the computer through a network. Examples of the non-transitory computer-readable storage medium include an arbitrary type of disk, as exemplified by a magnetic disk (a Floppy® disk, a hard disk drive (HDD) and the like) and an optical disk (a CD-ROM, a DVD disk, a Blu-ray disk and the like), and an arbitrary type of medium suitable for storing electronic commands, as exemplified by a read only memory (ROM), a random access memory (RAM), an EPROM, an EEPROM, a magnetic card, a flash memory and an optical card.

What is claimed is:

1. An information processing device comprising a control unit configured to send first information including a first date and time, to a user terminal, at a predetermined timing before the first date and time, the first date and time being a date and time at which baggage deposited in a movable locker is planned to be taken out, the movable locker being mounted on a vehicle, the user terminal being used by a user that has deposited the baggage in the locker, wherein:
the predetermined timing is a timing that is earlier than the first date and time by a first time length;
the control unit sends the first information to the user terminal at the timing that is earlier than the first date and time by the first time length; and
the control unit executes:
acquiring a position of the user terminal, and
setting the first time length such that the first time length is longer as a distance between a first place and the position of the user terminal is longer, the first place being a place at which the baggage is planned to be taken out, and wherein
the vehicle is an autonomous traveling vehicle that is controlled to autonomously circulate, responsive to generation and receipt of a request for service use, along a predetermined route including a designated time and place associated with the baggage deposit, and
the control unit further executes periodically acquiring and updating current position of the user terminal whose distance is taken into consideration when setting the first time length.

2. The information processing device according to claim 1, wherein the control unit accepts a designation of the first time length from the user terminal.

3. The information processing device according to claim 1, wherein:
the predetermined timing is a timing that is equal to or later than a date and time earlier than the first date and time by a second time length and at which a distance between a position of the vehicle and the first place becomes equal to or shorter than a first distance, the first place being the place at which the baggage is planned to be taken out; and
the control unit executes:
acquiring the position of the vehicle, and
sending the first information to the user terminal, at the timing that is equal to or later than the date and time earlier than the first date and time by the second time length and at which the distance between the position of the vehicle and the first place becomes equal to or shorter than the first distance.

4. The information processing device according to claim 1, wherein:
the predetermined timing is a timing that is equal to or later than a date and time earlier than the first date and time by a third time length and at which a distance between the position of the user terminal and the first place becomes equal to or shorter than a second distance, the first place being the place at which the baggage is planned to be taken out; and
the control unit executes:
acquiring the position of the user terminal, and
sending the first information to the user terminal, at the timing that is equal to or later than the date and time earlier than the first date and time by the third time length and at which the distance between the position of the user terminal and the first place becomes equal to or shorter than the second distance.

5. The information processing device according to claim 1, wherein the control unit accepts a designation of one of the timing that is earlier than the first date and time by the first time length, a timing that is equal to or later than a date and time earlier than the first date and time by a second time length and at which a distance between a position of the vehicle and the first place becomes equal to or shorter than a first distance, and a timing that is equal to or later than a date and time earlier than the first date and time by a third time length and at which a distance between the position of the user terminal and the first place becomes equal to or shorter than a second distance, as the predetermined timing, from the user terminal, the first place being the place at which the baggage is planned to be taken out.

6. The information processing device according to claim 5, wherein the control unit accepts the designation from the user terminal, together with a use request for the locker.

7. The information processing device according to claim 1, wherein as the first information, the control unit sends information including a current position of the vehicle and a date and time at which the vehicle is planned to arrive at the first place, to the user terminal, in addition to the first date and time, the first place being the place at which the baggage is planned to be taken out.

8. An information processing method in which a computer sends first information including a first date and time, to a user terminal, at a predetermined timing before the first date and time, the first date and time being a date and time at which baggage deposited in a movable locker is planned to be taken out, the movable locker being mounted on a vehicle, the user terminal being used by a user that has deposited the baggage in the locker, wherein:
the predetermined timing is a timing that is earlier than the first date and time by a first time length;
the computer sends the first information to the user terminal at the timing that is earlier than the first date and time by the first time length; and
the computer executes:
acquiring a position of the user terminal, and
setting the first time length such that the first time length is longer as a distance between a first place and the position of the user terminal is longer, the first place being a place at which the baggage is planned to be taken out, and wherein
the vehicle is an autonomous traveling vehicle that is controlled to autonomously circulate, responsive to generation and receipt of a request for service use, along a predetermined route including a designated time and place associated with the baggage deposit, and
the computer further executes periodically acquiring and updating current position of the user terminal whose distance is taken into consideration when setting the first time length.

9. The information processing method according to claim 8, wherein the computer accepts a designation of the first time length from the user terminal.

10. The information processing method according to claim 8, wherein:
the predetermined timing is a timing that is equal to or later than a date and time earlier than the first date and time by a second time length and at which a distance between a position of the vehicle and the first place becomes equal to or shorter than a first distance, the first place being the place at which the baggage is planned to be taken out; and
the computer executes:
acquiring the position of the vehicle, and
sending the first information to the user terminal, at the timing that is equal to or later than the date and time earlier than the first date and time by the second time length and at which the distance between the position of the vehicle and the first place becomes equal to or shorter than the first distance.

11. The information processing method according to claim 8, wherein:
the predetermined timing is a timing that is equal to or later than a date and time earlier than the first date and time by a third time length and at which a distance between the position of the user terminal and the first place becomes equal to or shorter than a second distance, the first place being the place at which the baggage is planned to be taken out; and
the computer executes:
acquiring the position of the user terminal, and
sending the first information to the user terminal, at the timing that is equal to or later than the date and time earlier than the first date and time by the third time length and at which the distance between the position of the user terminal and the first place becomes equal to or shorter than the second distance.

12. The information processing method according to claim 8, wherein the computer accepts a designation of one of the timing that is earlier than the first date and time by the first time length, a timing that is equal to or later than a date and time earlier than the first date and time by a second time length and at which a distance between a position of the vehicle and the first place becomes equal to or shorter than a first distance, and a timing that is equal to or later than a date and time earlier than the first date and time by a third time length and at which a distance between the position of the user terminal and the first place becomes equal to or shorter than a second distance, as the predetermined timing, from the user terminal, the first place being the place at which the baggage is planned to be taken out.

13. The information processing method according to claim 12, wherein the computer accepts the designation from the user terminal, together with a use request for the locker.

14. The information processing method according to claim 8, wherein as the first information, the computer sends information including a current position of the vehicle and a date and time at which the vehicle is planned to arrive at the first place, to the user terminal, in addition to the first date and time, the first place being the place at which the baggage is planned to be taken out.

15. A non-transitory storage medium that stores a program for causing a user terminal to output first information including a first date and time, at a predetermined timing before the first date and time, the first date and time being a date and time at which baggage deposited in a movable locker is planned to be taken out, the movable locker being mounted on a vehicle, wherein:
the predetermined timing is a timing that is earlier than the first date and time by a first time length;
the user terminal outputting the first information to the user terminal at the timing that is earlier than the first date and time by the first time length;
the program further acquiring a position of the user terminal, and
the program further setting the first time length such that the first time length is longer as a distance between a first place and the position of the user terminal is longer, the first place being a place at which the baggage is planned to be taken out, and wherein
the vehicle is an autonomous traveling vehicle that is controlled to autonomously circulate, responsive to generation and receipt of a request for service use, along a predetermined route including a designated time and place associated with the baggage deposit, and
the program further executing periodically acquiring and updating current position of the user terminal whose distance is taken into consideration when setting the first time length.

* * * * *